United States Patent [19]

Banovic

[11] Patent Number: 4,657,473
[45] Date of Patent: Apr. 14, 1987

[54] APPARATUS FOR PIVOTING A MANIPULATOR OPERATING HEAD ABOUT A YAW AXIS

[75] Inventor: Peter Banovic, Columbus, Ohio

[73] Assignee: Rimrock Corporation, Columbus, Ohio

[21] Appl. No.: 757,284

[22] Filed: Jul. 22, 1985

[51] Int. Cl.$^4$ .............................................. B25J 15/00
[52] U.S. Cl. ...................................... 414/739; 901/29
[58] Field of Search ............... 414/729, 730, 735, 739; 901/22, 27, 28, 29

[56] References Cited

U.S. PATENT DOCUMENTS

| 2,988,237 | 6/1961 | Devol | 214/11 |
| 3,251,483 | 5/1967 | Devol | 214/1 |
| 3,306,442 | 2/1967 | Devol | 209/121 |
| 3,306,471 | 2/1967 | Devol | 214/1 |
| 3,525,382 | 8/1970 | Devol | 164/154 |
| 4,511,305 | 4/1985 | Kawai et al. | 414/755 |

FOREIGN PATENT DOCUMENTS 1458379 10/1966 France ................... 901/27

Primary Examiner—Robert J. Spar
Assistant Examiner—Donald W. Underwood
Attorney, Agent, or Firm—Pearne, Gordon, McCoy & Granger

[57] ABSTRACT

Apparatus for pivoting a robot or manipulator operating head about a yaw axis wherein the head is mounted on a wrist mechanism with a roll axis. The operating head is mounted on a head support member connected by a yaw pin to the forward end of the wrist mechanism for pivotal movement between a normal, forwardly extending position and a yawed position. A fluid cylinder with a forwardly extending piston rod is mounted on the wrist mechanism and is operatively connected by flexible means to the head support member. The flexible means includes a bell crank with one arm operatively connected to the piston rod, and a link connected between the other end of the bell crank and the head support member. When the piston rod extends and retracts, the operating head is pivoted about the yaw axis. The linkage isolates the fluid cylinder from the gravity forces resulting from the moment produced about the yaw axis by roll motion of the operating head about the roll axis when the head is in the normal position.

4 Claims, 9 Drawing Figures

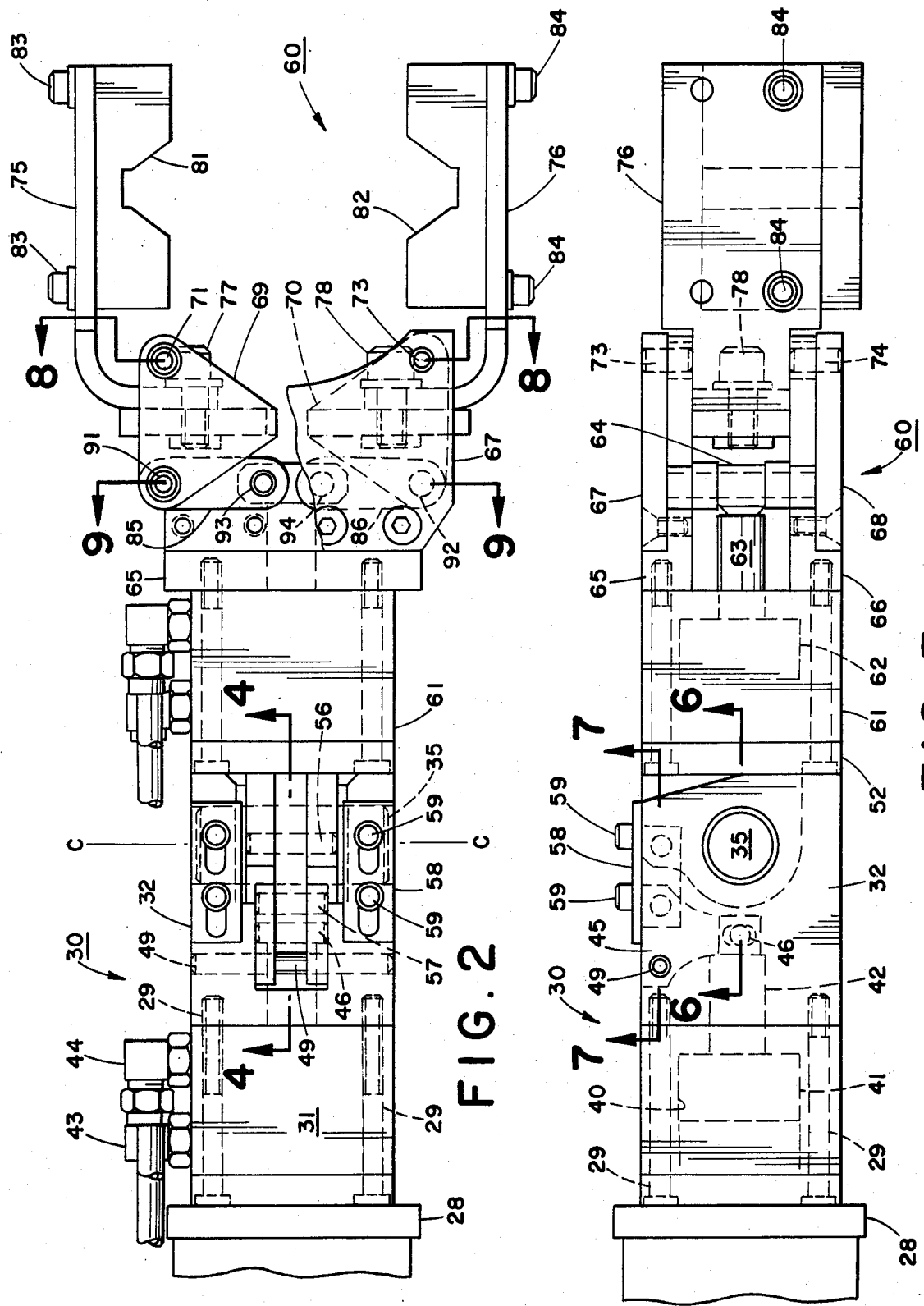

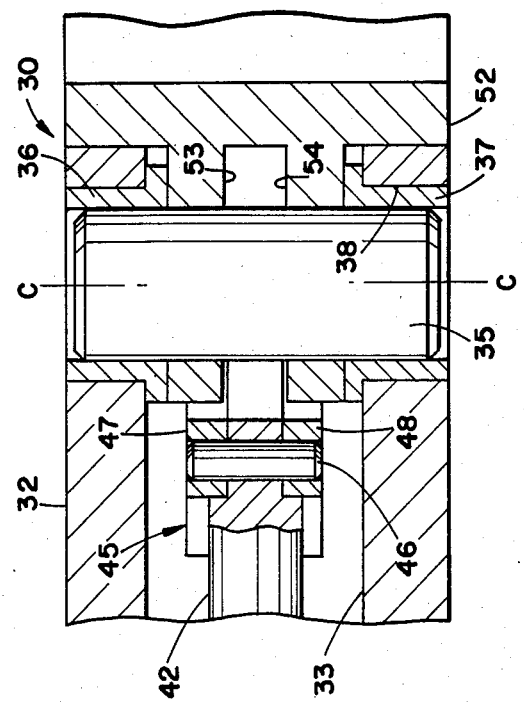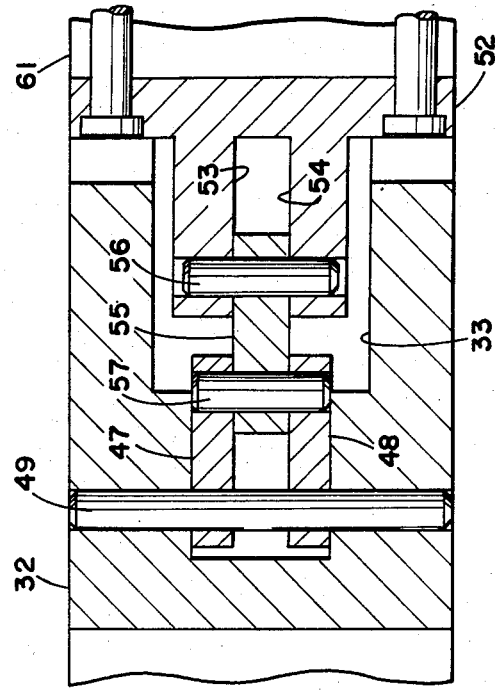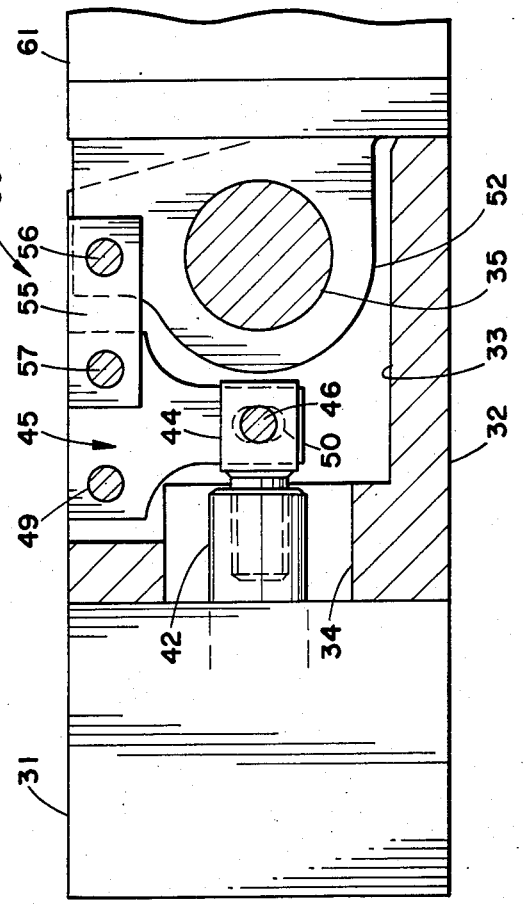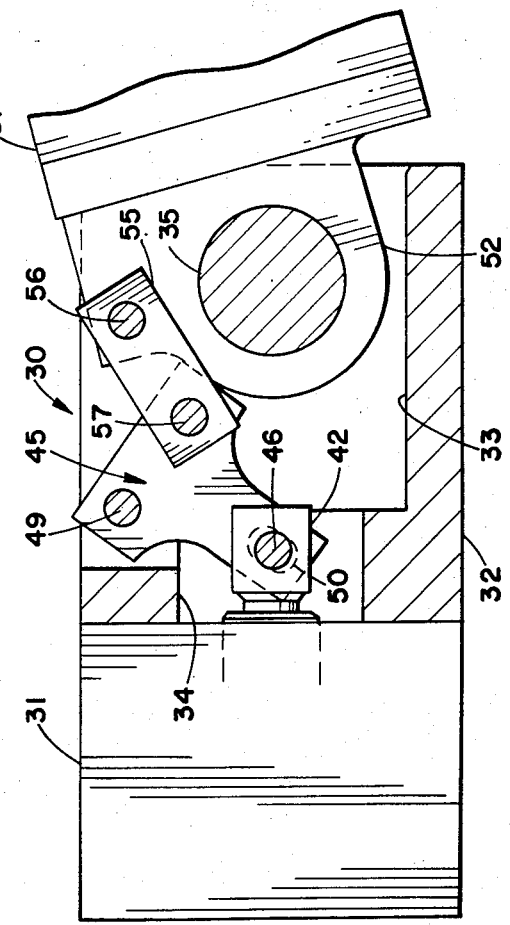

APPARATUS FOR PIVOTING A MANIPULATOR OPERATING HEAD ABOUT A YAW AXIS

BACKGROUND OF THE INVENTION

This invention relates to the positioning and control of various types of operating heads that are utilized to move work pieces sequentially through cycles wherein various industrial operations such as die casting, forging, assembly, stamping, welding etc. are performed. More particularly, the invention relates to equipment variously referred to as "robots", "manipulators", "pick and place mechanisms", "extractors", "actuators" etc. and especially to equipment in which an operating head such as prehensile "hand", spray head etc. is carried on an arm capable of several automatically controlled motions to achieve a wide range of travel.

Prior art equipment of the type described often utilizes an operating head, such as tongs or the like, mounted on an arm by a wrist joint that provides tipping motion about a horizontal axis perpendicular to the arm and roll motion about an axis parallel to or extending along the longitudinal center line of the arm. In addition to the tipping motion and roll motion, it is often desirable to have a yaw motion about an axis perpendicular to the plane defined by the tip axis and the roll axis.

Where the operating head is a pair of tongs that operate, for example, in a vertical plane it is desirable to have the means defining the yaw axis (pivot pin, hinge or the like) located as closely as possible to the tongs, preferably between the tip axis and the tongs. This permits the arm to be inserted into a work space and then pivoted laterally about a vertical yaw axis in order to grab the workpiece or the like located at one side or the other of the work space into which the operating head has been inserted. Since the hinge pin is generally vertical, the mechanism that operates the operating head by pivoting it about the yaw axis is not loaded with the weight of the work piece to be carried by the tongs. On the contrary the load or moment is carried by the pivot pin axle or the like, itself rather than by the yaw operating linkage.

In some applications, however, after the operating head, including the tongs and the work piece, is removed from the operating space, the head (and work piece) are rotated about the roll axis. If the head and work piece are rotated such that the tongs are in a horizontal plane perpendicular to the plane in which they initially grasp the work piece, a load is applied in such a way as to create a moment about the yaw axis. This tends to apply stress to the yaw operating mechanism which can be undersirable particularly if the yaw mechanism is fluid operated.

Accordingly, the problem to which the present invention is directed is the elimination of any stress on the yaw operating mechanism after the operating head is returned from a yawed position to a normal, forwardly-extended position and then rolled with the work piece about the roll axis.

The yaw device has particular utility in association with the manipulator shown and described in U.S. Pat. No. 4,417,845 entitled "Programmable Positioning and Operating Mechanism for Industrial Operating Head" granted Nov. 29, 1983. That patent discloses a manipulator specially adapted for use in the die casting industry. In many industrial die casting processes, it is common practice to use a mechanical device to extract castings from the die casting machine. The extractor is synchronized with the operation of the die casting machine and is adapted to extend an arm between the open platens of the die casting machine, grasp the casting, retract the arm and release the casting onto a conveyor belt or place it in a receptacle or quenching bath. In accordance with recent proposals, programmable industrial robots can be utilized as extractors to automatically transport the casting through a more complex set of operations.

Typical automatic devices for performing some or all of the functions desribed above and in which a yaw motion is provided for the operating head are disclosed in the following U.S. Pats.:

| U.S. Pat. No. | Patentee | Issue Date |
| --- | --- | --- |
| 2,998,237 | Devol | June 13, 1961 |
| 3,251,483 | Devol | May 17, 1967 |
| 3,306,442 | Devol | Feb. 28, 1967 |
| 3,306,471 | Devol | Feb. 28, 1967 |
| 3,525,382 | Devol | Aug. 25, 1970 |

The yaw mechanism of the present invention resolves many of the difficulties encountered with prior art devices and affords other features and advantages heretofore not obtainable.

SUMMARY OF THE INVENTION

A general object of the invention is to provide a yaw mechanism for a manipulator adapted for movement relative to several axes of motion through a plurality of programmable operating cycles.

Another object is to provide a yaw mechanism for an operating head which enables the head to be turned about a yaw axis between a forwardly extended position and a yawed position relative to an operating arm wherein, should the operating head be subsequently turned about a roll axis, the effect of the moment acting on the yaw operating mechanism is reduced or in fact eliminated.

A further object is to provide an apparatus for extracting castings from a die casting machine, that satisfies the requirements outlined above.

These and other objects and advantages are accomplished by the apparatus of the invention which is adapted to pivot an operating head relative to a manipulator arm about a normally vertical yaw axis. The arm has a wrist assembly at its outer end adapted to rotate the operating head about a roll axis extending longitudinally relative to the arm. The mechanism includes a yaw pin mounted on the manipulator arm and adapted to support the operating head for pivotal movement about a yaw axis between a normal position aligned with the roll axis and a yawed position. A lever arm associated with the operating head extends laterally from the yaw pin relative to the roll axis and defines a pivot point at its outer end. A fluid cylinder is mounted on the manipulator arm and has a piston and piston rod extending parallel to the roll axis toward the operating head. The piston rod is operatively connected to the lever arm by a linkage that includes a bell crank mounted on the manipulator arm for pivotal movement about a crank axis parallel to the yaw axis and spaced laterally from the roll axis. One arm of the bell crank is pivotally connected to the piston rod and the other end defines a pivot. The pivot of the other bell crank arm and the crank arm are connected by a link so that linear movement of the piston from its normal rest position to an extended position pivots the operating head about the yaw axis from the normal position to a yawed position.

When the operating head is in its normal position, the pivot axis of the bell crank and the pivot axes of the link are so aligned that when the operating head is turned about its roll axis to a position wherein the yaw axis is horizontal or otherwise non-vertical, the yaw mechanism is essentially locked such that the moment acting about the yaw axis due to the weight of the operating head and work piece is not applied in a manner tending to move or stress the yaw linkage nor to load the fluid cylinder.

BRIEF DESCRIPTION OF THE DRAWINGS

FIG. 2 is a fragmentary side elevation on an enlarged scale of the manipulator arm of FIG. 1 with parts broken away for the purpose of illustration;

FIG. 3 is an elevational view from below of the manipulator arm of FIGS. 1 and 2;

FIG. 4 is a fragmentary sectional view on an enlarged scale illustrating the yaw mechanism of the invention and taken on the line 4—4 of FIG. 2;

FIG. 5 is a fragmentary sectional view on an enlarged scale similar to FIG. 4 but showing the yaw mechanism actuated to cause the operating head to be rotated 15° about the yaw axis;

FIG. 6 is a fragmentary sectional view on an enlarged scale taken on the line 6—6 of FIG. 3;

FIG. 7 is a fragmentary sectional view on an enlarged scale taken on the line 7—7 of FIG. 3;

DESCRIPTION OF THE PREFERRED EMBODIMENT

Figure 1:
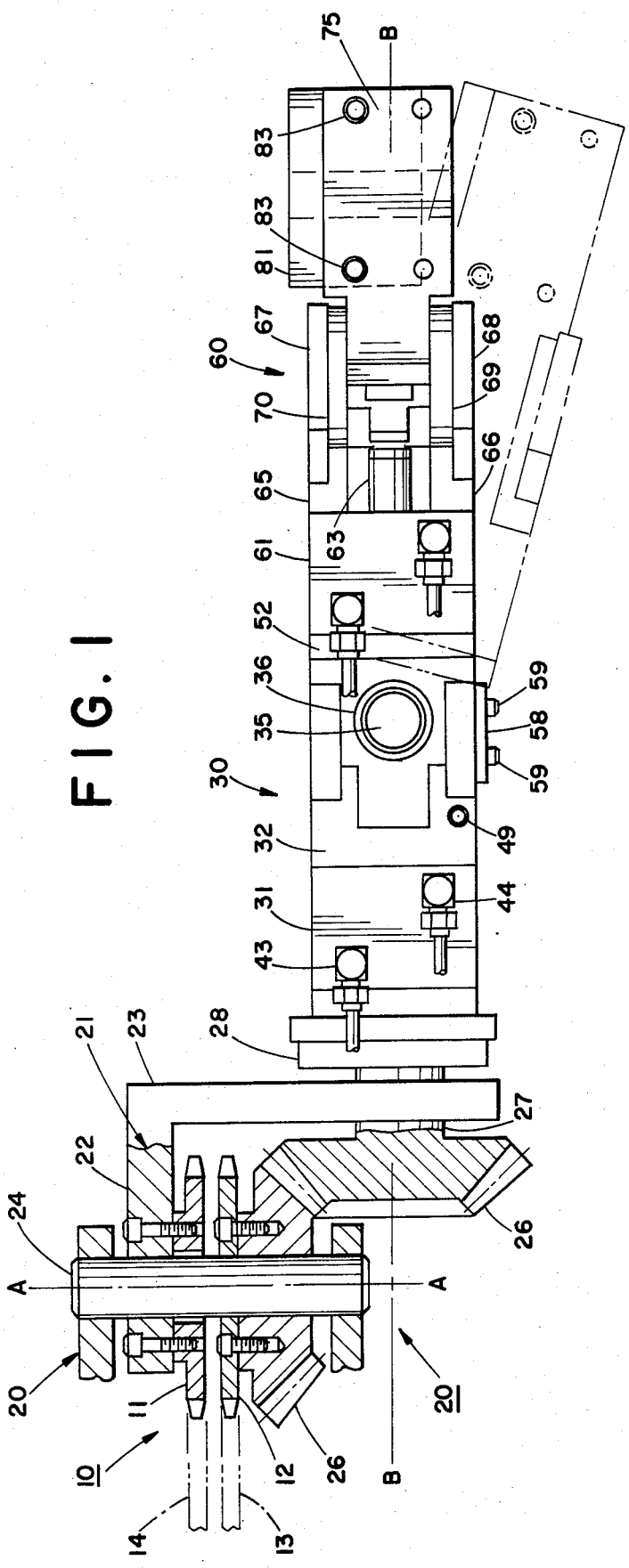
FIG. 1 is a plan view of the outer portion of a manipulator arm having a yaw mechanism embodying the invention and showing in dashed lines the operating head turned to a 15° yawed position.

Referring more particularly to the drawings and initially to FIG. 1, there is shown the outer end of a manipulator arm 10 including a wrist assembly 20, a yaw assembly 30 embodying the invention and an operating head or tong assembly 60. The wrist assembly 20 is similar to that shown in connection with the robot or manipulator of U.S. Pat. No. 4,417,845 and the invention will be illustrated and described for use in association with the mechanism of that patent.

The tong assembly 60 is shown in its normal, forwardly extending position in solid lines in FIG. 1 and pivoted 15° about its yaw axis C—C to a yawed position in dashed lines in FIG. 1. The invention as shown and described herein forms part of an extractor for removing castings from a die casting machine. The mechanism is adapted to move the tong assembly 60 between open die platens of the die casting machine whereupon it grasps and extracts the casting and transports it sequentially to various processing stations.

The operating arm 10 has at its outer end a wrist tilt sprocket 11 and a wrist roll sprocket 12 (FIG. 1). The wrist tilt sprocket 11 is turned by a roller chain 14 and the wrist roll sprocket 12 is turned by another roller chain 13. The drives for the roller chains are described in U.S. Pat. No. 4,417,845 identified above.

The wrist assembly 20 includes a wrist tilt block 21 having a side leg 22 and an end leg 23. The side leg 22 is journalled on a wrist pin 24. The wrist tilt block 21 is operatively connected to the wrist tilt sprocket 11 whereby turning of the sprocket in either direction is effective to tilt the wrist tilt block 21 about the wrist pin 24 and thus carry the operating head 60 through a range of tilted positions about a tilt axis A—A.

The wrist roll sprocket 12 is connected to a bevel gear 25 also journaled on the wrist pin 24 and which meshes with another bevel gear 26 mounted on a roll shaft 27. The axis B—B of the roll shaft 27 extends perpendicular to the wrist tip axis A—A defined by the wrist pin 24, the shaft being journalled in the end leg 23 of the block 21. At the forward end of the roll shaft 27 is a mounting flange 28 which supports the yaw assembly 30.

The yaw assembly 30 is secured to the mounting flange 28 such as by machine screws (not shown) and includes a rectangular main block 31 and a mounting block 32. The mounting block defines a laterally facing slot 33 with an open forward end. An axially extending bore 34 communicates with the slot 33. The mounting block 32 is secured to the main block 31 by machine screws 29.

A yaw pivot pin 35 is journalled in bushings 36 and 37 mounted in a lateral bore 38 extending vertically through the mounting block 32 as best shown in FIG. 6.

The main block 31 defines a cylinder chamber 40 with an operating piston 41. The piston has a rod 42 that extends forwardly into the axial bore 34 formed in the mounting block 32. Operating air for the cylinder chamber 40 is supplied and exhausted through a pair of air fittings 43 and 44 mounted on the main block 31.

The outer end of the piston rod 42 is connected to an arm of a bell crank assembly 45 by a pivot pin 46. The bell crank assembly 45 includes a pair of parallel plates 47 and 48 which pivotally engage the outer end of the piston rod therebetween. The pin 46 extends through slots 50 formed in the plates 47 and 48 to permit the pin 46 to slide as needed during extension and retraction movement as it pivots the bell crank assembly 45 about its axis. The plates 47 and 48 are pivotally connected to the mounting block 32 by a pivot pin 49 as best shown in FIG. 7.

A head support member or yaw clevis 52 is pivotally mounted by means of the yaw pin 35 to the mounting block 32 and is adapted to pivot about the yaw axis C—C between the normal position illustrated in FIG. 4 and a yawed position illustrated in FIG. 5 and shown in dashed lines in FIG. 1. The clevis 52 has a pair of parallel clevis arms 53 and 54 which define a slot therebetween. The arms are aligned generally perpendicular to the roll axis B—B.

The clevis 52 is adapted to be turned about the yaw axis C—C by means of a link 55 pivotally connected to the laterally extending arms 53, 54 of the clevis, by a pivot pin 56 that extends through aligned openings in the ends of the arms as best shown in FIG. 7. The opposite end of the link 55 is pivotally connected to the other arm of the bell crank 45 by a pivot pin 57.

Accordingly, when the piston 41 of the cylinder 40 is in its normal extended position illustrated in FIG. 4, the piston rod 42 positions the bell crank assembly 45 relative to the pivot pin 49 in such a position that the link 55 retains the yaw clevis 52 in a normal position with the tong assembly 60 extending longitudinally in an axial direction relative to the manipulator arm 10. However, when the cylinder 40 is operated to retract the piston 41 and piston rod 42, the rod turns the bell crank assembly 45 about the fixed pivot 49 whereupon the link 55 turns the yaw clevis 52 about the yaw axis C—C, in a counterclockwise direction as viewed in FIGS. 4 and 5 until the yaw clevis is turned to the position shown in FIG. 5. The slot 50 permits the pin 46 to slide therein to accommodate the geometry of this movement.

In the design shown the maximum yaw is 15°, the yaw movement being limited by engagement between the yaw clevis 52 and the tapered forward face of the mounting block 32. The limit position of the yaw clevis 52 may be varied, however, by adjusting the position of a yaw adjustment plate 58 secured by adjusting screws 59 to the side of the mounting block 52.

In particular, it should be noted that when the yaw clevis 52 is in its normal position, the fixed pivot pin 49 and the pivot pins 57 and 58 all have their respective axes coplanar in a plane tangent to a circle defined by a radius from the yaw axis C—C to the axis of the link pivot pin 57. Accordingly when the yaw clevis 52 is pivoted to the normal position shown in FIG. 4, any external force tending to rotate the tong assembly 60 about the yaw axis C—C would not transmit any load or stress through the bell crank assembly 45 to the piston 41 because essentially the yaw clevis 52 is locked in position due to the unique geometry embodied in the invention. Accordingly, if the tong assembly 60 were rolled about the roll axis B—B until the pin 35 was in a horizontal position (i.e, with the yaw axis C—C extending horizontally), the moment about the pin 35 would be resisted by a force acting through and perpendicular to the axes of the pivot pins 56 and 57. There would be no moment acting about the axis of the pin 35 tending to apply a load to the piston 41.

The operating head or tong assembly 60 includes a rectangular block 61 bolted to the yaw clevis 52. The block defines a cylinder bore 62 which receives a piston 63 with a piston rod 64 extending in a forward direction. A pair of mounting brackets 65 and 66 are secured by bolts just forwardly of the block 61. A pair of parallel plates 67 and 68 are secured by machine screws to the mounting brackets 65 and 66 and serve to support the various operating elements of the tong assembly.

Figure 8:
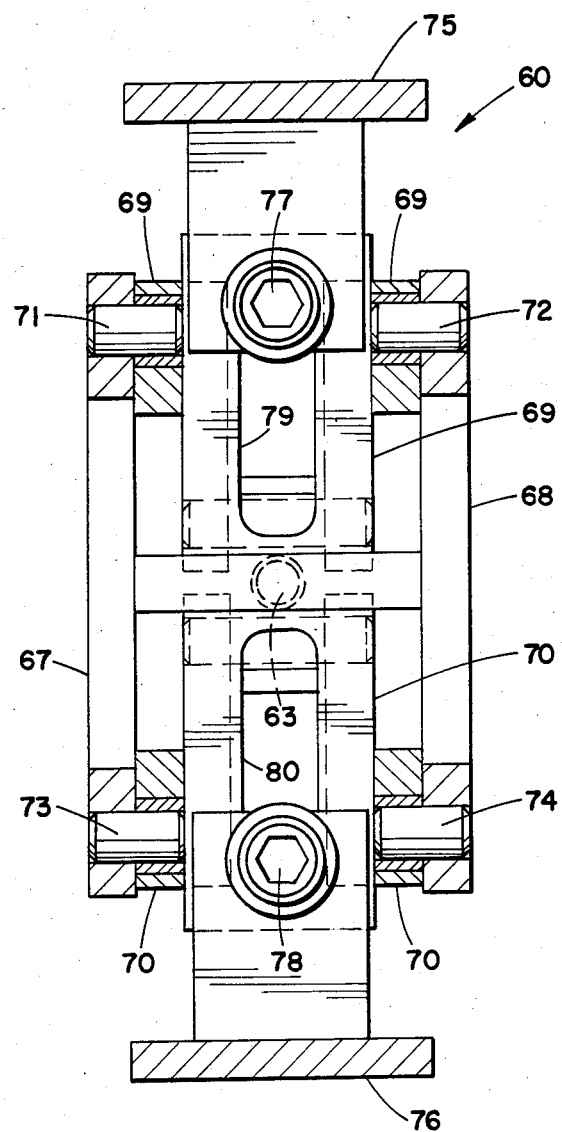
FIG. 8 is a sectional view on an enlarged scale showing the operating head used in association with the mechanism of the invention and taken on the line 8—8 of FIG. 2.
Figure 9:
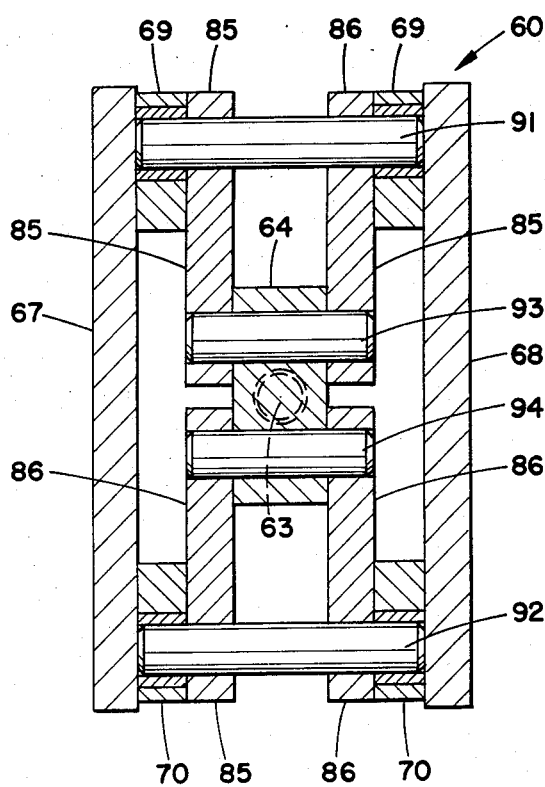
FIG. 9 is a sectional view on an enlarged scale showing the operating head and taken on the line 9—9 of FIG. 2.

A pair of lever arms including an upper lever arm 69 and a lower lever arm 70 are pivotally mounted between the plates 67 and 68 by pairs of fixed pivot pins including upper pivot pins 71 and 72 and lower pivot pins 73 and 74 (FIG. 8). A pair of tongs 75 and 76 are secured to the lever arms 69 and 70 respectively by bolts 77 and 78 received in slots 79 and 80 formed in the lever arms.

The tongs have an L-shaped bend so that the longer legs extend forwardly while the rear legs provide a means for clamping the tongs to the lever arms 69 and 70. The slots 79 and 80 permit adjustment of the tongs to accommodate the work piece to be handled.

Each of the tongs has a paw 81, 82 (FIG. 2) bolted thereto by screws 83 and 84 respectively and specially contoured to grip the work piece to be handled. Accordingly, the lever arms 69 and 70 may be pivoted about respective pins 71, 72, 73 and 74 to move the paws 81 and 82 toward and away from one another.

The lever arms 69 and 70 are operated by pairs of links including parallel upper links 85 and parallel lower links 86 connected between the respective lever arms and the end of the piston rod 64. The links 85 and 86 are pivotally connected to the lever arms by pins 91 and 92 and to the piston rod 64 by pins 93 and 94. Accordingly, extension and retraction of the piston 63 in the cylinder serves to move the tongs 75 and 76 toward and away from one another to accomplish the gripping function.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. In an apparatus for pivoting an operating head relative to a manipulator arm about a normally vertical yaw axis, said arm having a wrist mechanism at its outer end adapted to rotate said head about a generally horizontal roll axis extending longitudinally relative to said arm and generally perpendicular to said yaw axis, said operating head being carried on a head support member mounted at the forward end of said wrist mechanism for pivotal movement about said yaw axis and adapted to turn said operating head therewith between a normal forwardly facing position and a yawed position whereby when said head support member is rotated about said roll axis such that said yaw axis is not substantially vertical, the weight of said operating head and the load carried thereby applies a torsional force about said yaw axis, the improvement which comprises:

a fluid cylinder mounted on said wrist mechanism in axial alignment with said roll axis and having a piston rod extending forwardly therefrom; and articulating means connecting said piston rod to said support member; said means including:

a bell crank mounted on said wrist mechanism for pivotal movement about a crank pin with an axis spaced laterally from the roll axis, and having one arm operatively connected to said piston rod; and link means connecting another arm of said bell crank to said head support member at first and second pivot axes respectively, said first and second pivot axes and said crank pin axis being coplanar in a plane tangent to the circle defined by a radius from said yaw axis to said second pivot avis, when said operating head is in said normal position.

whereby linear movement of said piston rod pivots said operating head about said yaw axis and whereby when said operating head is in said operating position and is pivoted about said roll axis so that said yaw axis is not substantially vertical, said torsional force is applied entirely to said crank pin of said bell crank.

2. Apparatus as defined in claim 1, wherein said fluid cylinder is an air operated cylinder.

3. Apparatus as defined in claim 1, wherein said yaw axis intersects said roll axis and is perpendicular thereto.

4. Apparatus as defined in claim 1, wherein said operating head comprises a pair of tongs.

* * * * *